United States Patent [19]

Carlick et al.

[11] Patent Number: 4,666,984

[45] Date of Patent: May 19, 1987

[54] PROCESS FOR PREPARING URETHANE MODIFIED RESINS AND RESULTANT COMPOSITION

[75] Inventors: Daniel J. Carlick, Livingston; Edward G. Janusz, Wallington; Albert A. Kveglis, Pine Brook, all of N.J.

[73] Assignee: Sun Chemical Corporation, New York, N.Y.

[21] Appl. No.: 808,168

[22] Filed: Dec. 12, 1985

[51] Int. Cl.$^4$ ............................................. C08L 93/00
[52] U.S. Cl. .................................... 525/131; 260/102; 525/424; 525/440; 527/301; 527/600
[58] Field of Search ................. 525/131, 424, 440; 527/301, 600; 260/102

[56] References Cited

U.S. PATENT DOCUMENTS

| | | | |
|---|---|---|---|
| 2,400,519 | 5/1946 | Kroeger et al. | 106/30 |
| 2,416,433 | 2/1947 | Brown | 260/23 |
| 2,450,959 | 10/1948 | Heinecke | 106/30 |
| 2,720,461 | 10/1955 | Voet | 106/30 |
| 2,853,397 | 9/1958 | Seibet et al. | 106/237 |
| 3,412,053 | 11/1968 | Pugliese | 260/18 |
| 3,547,848 | 12/1970 | Marsh et al. | 260/22 |
| 3,615,752 | 10/1971 | Hoffman et al. | 106/27 |
| 3,870,684 | 5/1975 | Witt et al. | 260/75 |
| 4,146,533 | 5/1979 | Simon | 260/97 |
| 4,311,622 | 1/1982 | Butler | 260/18 |

*Primary Examiner*—Maurice J. Welsh
*Attorney, Agent, or Firm*—Mitchell D. Bittman

[57] ABSTRACT

A urethane modified resin is prepared by reacting a resin containing carboxyl groups with an amine-alcohol to form a resin-amine salt, followed by reacting the resin-amine salt with a polyisocyanate.

26 Claims, No Drawings

PROCESS FOR PREPARING URETHANE MODIFIED RESINS AND RESULTANT COMPOSITION

BACKROUND OF THE INVENTION

This invention relates to modifying resins, more specifically to preparing an amino-alcohol urethane modified resin which is particularly suitable for use as a vehicle in inks and coatings.

It is common in the manufacture of inks to use vehicles made up of a resin which is dissolved in a solvent, and further containing pigments suspended therein. Various techniques have been suggested in the printing ink art for modifying resins to thereby obtain desireable properties in the resultant ink. Among some of the resin modifications suggested are: U.S. Pat. No. 2,416,433 which discloses reacting an amine, a polyester and an acid resin; U.S. Pat. No. 2,450,959 which discloses reacting an acidic resin with an alkali material such as triethanolamine; U.S. Pat. Nos. 2,400,519 and 3,615,752 which discloses reacting an amine with a resin (e.g. a rosin) with the product in solution in a glycol; and U.S. Pat. No. 3,870,684 which discloses dispersing polyurethanes or polyureas in a water solution containing polyamines.

Another common method of modifying resins to increase viscosity and form a gel is to chelate a resin with a metal ion such as aluminum. However, chelation of a resin with such a metal ion does not have a defined chemical end point resulting in unpredictability, with the completion of the reaction determined via unreliable physical measurements. A further technique for obtaining desireable properties in the resultant ink or coating includes incorporating various additives such as disclosed by: U.S. Pat. No. 2,853,397 which discloses adding urethanes to colored lacquers with the urethane obtained by either reacting phenyl isocyanate with ethanol amine or by causing monohydroxyl compounds to act on the reaction products prepared from polyalcohols and diisocyanate; and U.S. Pat. No. 3,547,848 which discloses preparing a thixotropic coating by adding to a varnish or paint a urea produced by reacting an aliphatic amine and an isocyanate.

While the above modified resins and additives may be suitable for the purposes identified therein, a method of modifying various types of resins is needed in order to prepare resins, binders, varnishes or vehicles for the ink and coating industry which have defined reaction end points to provide reproducible results, with defined viscosities and shortness ratios as well as improved holdout properties.

SUMMARY OF THE INVENTION

Briefly, this invention provides a process for modifying resins which comprises reacting a resin containing carboxyl group with an amino-alcohol to form a resin-amine salt, followed by reacting the resin-amine salt with a polyisocyanate to form a urethane modified resin.

DETAILED DESCRIPTION OF THE INVENTION

The modified resin of this invention is prepared by reacting a resin containing a carboxyl group. Any carboxyl functional polymer or oligomer would be a suitable resin for modification. The resin preferably has an acid number above 5 and more preferably from 10 to 75. Metallic resin salts would also be suitable but only if carboxyl groups are present.

Suitable resins include alkyds, acrylics, styrenated acrylics, vinyl acrylics, modified hydrocarbon resins, rosin, dimerized rosin and esters thereof, metallized rosin, maleic-modified rosin and esters thereof, phenolic-modified rosin and esters thereof, styrene-maleic copolymers, ethylene-maleic copolymers, polyesters, polyamides, carboxymethyl cellulose, fumarated rosin and esters thereof. The preferred resins are modified rosin esters, alkyds and metallized rosin because these resins are preferred in ink systems.

The resin is reacted with an amino-alcohol to form a resin-amine salt. Various amino-alcohols would be suitable, including mono-, di-, tri-, and higher alcohols containing mono-, di-, tri- and higher amine functionality such as: mono-, di-, and triethanolamines, tris (hydroxymethyl) aminomethane, 2-,3-,4-aminobenzyl alcohols, isomeric aminobutyl alcohols, 2-,3-,4-aminocyclohexanols and methylated cyclohexanols, 2-(2-aminoethoxy) ethanol, 2-(2-aminoethylamino) ethanol, $\alpha$-(1-aminoethyl) benzyl alcohol, 2-amino-2-ethyl-1,3-propanediol, 2-amino-1-hexanol, 6-amino-1-hexanol, 2-amino-1-phenylethanol, 2-amino-3-methyl-1-butanol, $\alpha$-(aminomethyl) benzyl alcohol, leucinol, isoleucinol, 2-amino-2-methyl-1,3-propanediol, 2-amino-2-methyl-1-propanol, 2- and 5-amino-1-pentanols, 2-and 4-aminophenethyl alcohols, 2-amino-1- phenyl-1,3-propanediol, 2-amino-3-phenyl-1-propanol, 3-amino-1,2-propanediol-,isopropanolamine, 2- and 3-amino-1-propanols, and N-(3-aminopropyl) diethanolamine. While monohydroxyamines do work, polyhydroxy amines are preferred as the increased number of pendant hydroxyl groups provide additional sites for subsequent polymeric urethane modification. The preferred polyhydroxy amines are diethanolamine, triethanolamine and tris (hydroxymethyl) aminomethane because of the plurality of hydroxyl group present. The amino-alcohol is added in an amount to provide a molar ratio of amine:carboxyl group in the range of 0.01:1 to 1:1, preferably 0.7:1 to 1:1.

The resin-amine salt is then reacted with a polyisocyanate to form a urethane modified resin. The reaction with di- and higher isocyanates (i.e. polyisocyanate), as opposed to a monoisocyanate, is required to form polymers of increased size which provides an increased viscosity and can result in a varnish which provides the resultant ink with improved holdout characteristics (i.e. the ability of an ink not to penetrate paper) even with low quality paper stock.

Suitable polyisocyanates include aliphatic, cycloaliphatic or aromatic diisocyanates, tolylenediisocyanate and trimer, isophorone diisocyanate and trimer, 4,4'-diphenylmethane diisocyanate, 4,4'-dicyclohexylmethane diisocyanate, polymethylene polyphenyl isocyanate, polymeric 4,4 -diphenyl-methane diisocyanate, 1,6-hexamethylene diisocyanate, isocyanate terminated polyethers, polyesters and polyurethanes. The preferred polyisocyanates are isophorone diisocyanate, polymeric 4,4'-diphenylmethane diisocyanate, 1,6-hexamethylene diisocyanate and tolylene diisocyanate because of compatability with the other ingredients in an ink or coating system, solubility and ease of handling. The polyisocyanate is added in an amount effective to provide a molar ratio of isocyanate groups:carboxyl groups in the resin of 0.01:1 to 4:1, preferably 0.3:1 to 3:1, or to provide a molar ratio of isocyanate groups:hydroxyl groups of 0.01:1 to 1:1, preferably 0.3:1 to 1:1.

The modification reactions of the resin are carried out by first mixing the resin with the amino alcohol with the mixture heated to 25° to 200° C. preferably 90° to 140° C. and held there to complete the reaction, typically about 1 to 3 hours. Then the reactor mass may be cooled to below 100° C. preferably about 90° C. The polyisocyanate is added (preferably slowly), and the temperature adjusted to 80° to 150° C., preferably 100° to 140° C. and held there, typically about 1 to 3 hours to complete the reaction. The urethane modified resin thus prepared can then be diluted with a solvent (e.g. toluene) to provide a resin with a desired amount of non-volatiles, generally 25 to 75%.

In general a urethane modified resin can be reproducibly prepared with any desired rheological properties by varying the type and amounts of the resin, amino-alcohol and polyisocyanate in the reaction. Generally the following properties can be obtained: viscosities between 100 to 3000 poises; yield values of 5000 to 100,000 dynes/cm$^2$; shortness ratios of 10 to 200; desired holdout (penetration) characteristics; heat stablity (stable up to about 200° C.); and potential for fast solvent release leading to improved printability.

The resultant urethane modified resin can be used to prepare varnishes such as: a publication gravure varnish with a viscosity preferably within the range of B to >>Z10 at 40% non-volatiles as measured on a Gardner-Holdt Scale at 25° C.; a varnish for paste inks with any desired shortness ratio even up to 150; a heat set gel varnish with a viscosity within the range of 150–600 poises and yield values from 6,000–80,000 dynes/cm$^2$; and a radiation curable gel varnish with a viscosity ranging from 800–3,000 poises and yield values ranging from 4,000–20,000 dynes/cm$^2$.

In general, the urethane modified resin prepared by this invention can be used in the following general ink formulations as part or all of the resin, binder or oligomer:

| Weight % of Ingredient | General Printing Ink | Publication Gravure Printing Ink | Heat-Set Web-Offset Printing Ink | Radiation Curable Printing Ink |
|---|---|---|---|---|
| Resin | 10–55 | 10–30 | 35–55 | — |
| Oligomers | — | — | — | 2–30 |
| Solvents | 25–80 | 35–80 | 25–40 | — |
| Reactive Diluents | — | — | — | 5–70 |
| Pigments | 3–45 | 3–30 | 10–15 | 2–25 |
| Other Additives | 1–8 | 1–5 | 1–5 | 1–2 |
| Photoinitiators | — | — | — | 0–10 |

This invention provides an improvement in the performance of varnishes used to make heat-set printing inks. Varnish solutions for heat-set inks are commonly made from resins containing carboxyl groups and aluminum chelate compounds. These gelled varnishes in an appropriate solvent provide the rheology properties needed to produce high quality inks. However, the gelled aluminum chelate compounds are troublesome because of an indefinite gellation end point sometimes leading to unreproducible products and lack of heat stability (viscosity and yield values can be irreversibly destroyed at temperatures of about 190° C.). The present invention avoids the use of sometimes troublesome aluminum chelate compounds and provides the required rheology properties in a consistently reproducible manner. In this invention carboxyl groups in the heat-set varnish are reacted with an amino alcohol to form an amine-salt with appendant hydroxyl groups which are further reacted with a polyisocyanate to form urethane linkages. Heat-set printing inks made from the urethane modified resins have improved properties over those made with conventional aluminum chelated resins, i.e. urethane modified resins can provide varnishes with higher shortness ratios of 80 to 150 as opposed to shortness ratios generally of about 40 to 75 for aluminum chelated resins with the higher shortness ratios providing improved printability and dot sharpness.

The urethane modified resin can also be used in various types of coatings such as gel coatings for thermosetting polyester and epoxy laminates, castings, moldings, etc. with the gel coating generally containing: resin 50%–80% by weight; crosslinker or reactive diluent 10%–50% by weight; initiator or accelerator 0.1%–5% by weight; and other additives 1%–5% by weight.

EXAMPLE 1

Into a one liter round bottom flask equipped with a stirrer, thermometer, and trap filled with toluene and surmounted by a water-cooled condenser were charged 500 grams (0.35 carboxyl equivalents) of 60% non-volatile in toluene metal resinate solution, and 30.3 grams (0.25 amine equivalents) tris(hydroxymethyl)amino methane. The reaction mass was heated to reflux temperature (109° C.) and held one hour.

The reaction mass was then cooled to 90° C. whereupon 8.7 grams (0.1 isocyanate equivalents) tolylenediisocyanate were slowly added. The reaction mass was heated at 90° C. for thirty minutes at which time the isocyanate had reacted as determined by an Infra-Red scan of the reaction mixture. The reaction mass when adjusted with 26 grams toluene to retain a 60% non-volatiles content had a viscosity of >Z10 on the Gardner-Holdt scale at 25° C. and good holdout properties when in an ink and applied to uncoated stock paper (no penetration of ink through paper). The original unmodified resinate at a 60% non-volatile content had a viscosity of U-V on the same scale and poor holdout properties when in an ink as evidenced by the appearance of ink on the reverse side of the printed sheet of uncoated stock paper.

EXAMPLE 2

In the same equipment as in Example 1, and using the same procedure were reacted,

| | |
|---|---|
| 500. g (0.35 equivalents) | 60% non-volatile metal resinate solution |
| 30.3 g (0.25 equivalents) | Tris(hydroxymethyl)amino methane |
| 11.1 g (0.1 equivalents) | Isophorone diisocyanate |
| 27.6 g | Toluene |

The resultant product at a 60% non-volatile content had a viscosity >Z10 on the Gardner-Holdt viscosity scale at 25° C.

Publication gravure inks made from the products of both Examples 1 and 2 exhibit improved quality when compared to inks made from the commonly used unmodified metal resinate varnish in that higher holdout on uncoated stock paper was exhibited and better color development, as evidenced by an increase in color value (more vivid color).

EXAMPLE 3

Into a one liter round bottom flask equipped with a stirrer, thermometer, inert gas inlet tube, and water cooled condenser were charged:

| 170.0 grams | Ink Oil (Magie 470 Oil) |
|---|---|
| 23.2 grams | Alkyd Resin |
| 124.0 grams | Hydrocarbon Resin |
| 82.8 grams | Rosin Ester |

The mass was heated to 175° C. to dissolve the mixture, followed by cooling the reaction mass to room temperature. 20 Grams of tall oil rosin were added to the reaction mass and the mixture was heated to 100° C. and held at that temperature for about ten minutes. To the reaction mass 9.9 grams tris(hydroxymethyl) amino methane was added at 100° C. The reaction mass was held one and one-half hours at 100° C., after which were added 21.4 grams tolylene diisocyanate. The reaction continued at 100°–107° C. for two hours and fifteen minutes until all the isocyanate had reacted as determined by an Infra-Red scan. The varnish was adjusted to 50% non-volatile content by the addition of 73.4 grams of ink oil. The resultant heat-set web-offset gel varnish had a viscosity of 199 poises at 25° C. on the Laray scale, a yield stress value of 20988 dynes/cm$^2$ and a shortness ratio of 105 as measured on a Laray Falling Rod Viscometer. Before modification the resin mixture had a viscosity of 196 poises, a shortness ratio of 4 and a yield stress value of 841 dynes/cm$^2$.

EXAMPLE 4

In the same equipment as Example 3 and using the same procedure were reacted,

| 170.0 grams | Ink Oil |
|---|---|
| 23.2 grams | Alkyd Resin |
| 124.0 grams | Hydrocarbon Resin |
| 82.8 grams | Rosin Ester |
| 20.0 grams | Zincated Rosin |
| 5.6 grams | Tris(hydroxymethyl)amino methane |
| 11.5 grams | Tolylene diisocyanate |
| 97.1 grams | Ink Oil |

The resultant heat-set web-offset gel varnish had a viscosity at 25° C. of 239 poses on the Laray scale and a yield stress value of 19854 dynes/cm$^2$ and a shortness ratio of 83 as measured on a Laray Falling Rod Viscometer. Before modification the resin mixture had a viscosity of 201 poises, a yield stress value of 873 dynes/cm$^2$ and a shortness ratio of 4.3.

Heat-set web-offset inks made from the products of both Examples 3 and 4 exhibited printing quality, as good as the best inks made based on varnishes using conventional aluminum gellants.

This method of rheology modification is generally applicable to solutions of any carboxyl containing resin. For example, epoxy acrylate half esters, carboxyl modified hydrocarbon resins, alkyds, carboxyl functional acrylics and polyesters are all amenable to modification and gelling via this reaction.

What is claimed is:
1. Process for modifying resins comprising:
   (a) reacting a resin containing carboxyl groups with an amino alcohol to form a resin-amine salt;
   (b) reacting the resin-amine salt with a polyisocyanate to form a urethane modified resin.

2. Process of claim 1 wherein the amino alcohol is a polyhydroxy amine.

3. Process of claim 2 wherein the amino alcohol is present in an amount effective to provide a molar ratio of amine: carboxyl groups in the resin of 0.01:1 to 1:1.

4. Process of claim 3 wherein the polyhydroxy amine is chosen from the group consisting of tris (hydroxymethyl) aminomethane, triethanolamine and diethanolamine.

5. Process of claim 4 wherein the amino alcohol is present in an amount effective to provide a molar ratio of amine:carboxyl groups in the resin of 0.7:1 to 1:1.

6. Process of claim 3 wherein the polyisocyanate is present in an amount effective to provide a molar ratio of isocyanate groups: carboxyl groups in the resin of 0.01:1 to 4:1.

7. Process of claim 6 wherein the polyisocyanate is an aliphatic, cycloaliphatic or aromatic diisocyanate.

8. Process of claim 5 wherein the diisocyanate is chosen from the group consisting of tolylene diisocyanate, isophorone diisocyanate, 1,6-hexamethylene diisocyanate and polymeric 1,4-diphenylmethane diisocyanate.

9. Process of claim 6 wherein the polyisocyanate is present in an amount effective to provide a molar ratio of isocyanate groups: carboxyl groups in the resin of 0.3:1 to 3:1.

10. Process of claim 3 wherein the polyisocyanate is present in an amount effective to provide a molar ratio of isocyanate groups: hydroxyl groups of 0.01:1 to 1:1.

11. Process of claim 10 wherein the polyisocyanate is present in an amount effective to provide a molar ratio of isocyanate groups: hydroxyl groups of 0.3:1 to 1:1.

12. Process of claim 6 wherein the resin has an acid number of above 5.

13. Process of claim 12 wherein the resin is chosen from the group consisting of modified rosin esters, alkyds and metallized rosin.

14. Process of claim 12 wherein the resin has an acid number of from 10 to 75.

15. Process of claim 1 wherein the reaction of Step (a) is carried out at a temperature between 25° C. and 200° C., and the reaction of Step (b) is carried out at a temperature between 80° C. and 150° C.

16. Process of claim 15 further comprising diluting the urethane modified resin with a solvent to a level of 25 to 75% of non-volatiles.

17. Process of claim 16 wherein the urethane modified resin has a viscosity of 100–3000 poises.

18. Process of claim 16 wherein the urethane modified resin has a shortness ratio of 10 to 200.

19. Process as in claims 1, 4, 6, 8, 13 or 16 further comprising adding the urethane modified resin to a printing ink.

20. Process as in claims 1, 4, 6, 8, 13 or 16 further comprising adding the urethane modified resin to a coating composition.

21. Product prepared by the process as in claims 1, 4, 6, 8, 13 or 16.

22. A resin composition comprising a polymeric urethane modified resin-amine salt.

23. Composition of claim 21 wherein the resin-amine salt is derived from a resin with a acid number of above 5 reacted with a polyhydroxy amine.

24. Composition of claim 23 wherein the polymeric urethane modification is derived from a polyisocyanate reacted with the resin-amine salt.

25. A printing ink containing the resin composition of claim 22.

26. A coating composition containing the resin composition of claim 22.

* * * * *